United States Patent [19]
Cahill, III

[11] Patent Number: 5,583,536
[45] Date of Patent: Dec. 10, 1996

[54] METHOD AND APPARATUS FOR ANALOG VIDEO MERGING AND KEY DETECTION

[75] Inventor: Benjamin M. Cahill, III, Ringoes, N.J.

[73] Assignee: Intel Corporation, Santa Clara, Calif.

[21] Appl. No.: 255,666

[22] Filed: Jun. 9, 1994

[51] Int. Cl.$^6$ ........................................ G09G 5/00
[52] U.S. Cl. ................... 345/113; 345/115; 348/584; 348/592
[58] Field of Search ................... 348/584, 586, 348/590, 591, 592, 597, 668; 345/113, 114, 115, 116

[56] References Cited

U.S. PATENT DOCUMENTS

| | | | |
|---|---|---|---|
| 4,599,611 | 7/1986 | Bowker et al. | 345/116 |
| 5,249,039 | 9/1993 | Chaplin | 348/587 |
| 5,260,695 | 11/1993 | Gengler et al. | 345/115 |
| 5,402,148 | 3/1995 | Post et al. | 345/132 |
| 5,406,306 | 4/1995 | Siann et al. | 345/115 |
| 5,432,528 | 7/1995 | Ritter | 345/115 |

*Primary Examiner*—Richard Hjerpe
*Assistant Examiner*—Juliana S. Kim
*Attorney, Agent, or Firm*—Blakely, Sokoloff, Taylor & Zafman

[57] ABSTRACT

Monochrome and color video mixers mix an overlay image with a default image to form a composite image to be displayed on a computer display. The monochrome video mixer includes a summing circuit for summing an overlay signal and a default signal to generate a composite signal. The overlay signal corresponds to the overlay image, the default signal corresponds to the default image, and the composite signal corresponds to the composite image. The video mixer includes a comparator that has a first input for receiving the composite signal and a second input for receiving the overlay signal. The comparator compares the signal level measured at the first input with the signal level measured at the second input. In response to the comparison, the comparator provides an enable signal in the presence of a default key color signal. In response to the enable signal, an enabling circuit in the video mixer provides the overlay signal to the summing circuit. The enabling circuit provides the overlay signal to the summing circuit when the enable signal indicates that the first input signal level is equal to the second input signal level, or, alternatively, when the first input signal level is less than the second input signal level. A color video mixer includes a number of the above-described monochrome video mixers, wherein each monochrome video mixer provides a separate output to a color gun of the display device. The overlay signal from each mixer is passed on to its respective color gun (through the mixer summing circuit) only if all the comparators (for all monochrome mixers) provide an enable signal.

50 Claims, 5 Drawing Sheets

METHOD AND APPARATUS FOR ANALOG VIDEO MERGING AND KEY DETECTION

BACKGROUND OF THE INVENTION

1. Field of the Invention

The present invention relates to the field of data processing, and more particularly to the overlaying of images on a display output device.

2. Art Background

Modern data processing systems generally provide visual output by way of such output devices as cathode ray tubes or liquid crystal displays. The performance of such systems can be enhanced when the visual display receives information from more than one source, and overlays the information received from a first source (default) with the information received from a second source (overlay). The overlaying of such information can be especially useful where only a portion of the default information is hidden by the overlay information. For example, a computer system typically includes a graphics subsystem that provides background graphics, such as windows, on a rasterized computer display. A separate video subsystem of the computer, typically residing on a video card, may provide video information, such as a motion video image, which overlays the inside of the window to serve as the contents of the window. The mixed result is displayed on a display monitor.

A number of techniques can be used to overlay images. FIG. 1 is a simplified block diagram of a video mixing system in which an overlay signal from a first source 100 is mixed in a mixing or blending circuit 102 with a default or background signal from a second source 104. The mixed result is displayed on a display 106. The mixer 102 may be implemented as a digital mixer, which mixes the digital outputs of the sources 100 and 104 and then converts the composite result to an analog signal for display. Alternatively, the mixer 102 may be an analog mixer mixing analog signals from the sources 100 and 104.

FIG. 2 illustrates a simple current summing approach to analog mixing. The overlay source 100 and the default source 104 are each implemented as high impedance current sources providing display signals that are merged into a current summing node 200 to provide a common current signal to drive the display monitor 106. As an example, assume that a graphics card acts as the source 104 to output a window frame through the current summing node 200 to the display monitor 106. The graphics card 104 includes a graphics controller (not shown) and a graphics frame buffer (not shown) that digitally stores both the window frame image as well as a black (zero current or low current) color within the window frame. It also contains a digital-to-analog converter (DAC) with a high impedance output characteristic which is used to convert the digitally stored image into an analog current signal. The overlay video source 100 similarly employs a video controller, a video frame buffer, and a high impedance DAC. The video source 100 is synchronized with the graphics card 104 so that the intended overlay video contents of the window are output from the video source 100 at a raster position that corresponds to the interior of the window frame stored in the graphics frame buffer, and so that black (zero current or low current) is output from the video source 100 everywhere else within the raster. Using this method, the current outputs of the two DACs simply sum together to drive the display monitor. Because a black color is represented by a zero current or very low current output from either DAC, the addition of a non-black color from either source to the black color from the other source results in a current sum that represents only the non-black color.

The current summing merge suffers from a number of drawbacks. For one, assume that an arbitrarily shaped graphics object is desired to be drawn by the graphics source 104 to mask the overlay image, for example, when drawing a caption, pull-down menu, or other useful shapes on top of the image produced by the video source 100. In this case, special means must be provided in the video source 100 to guarantee that its output will be black wherever the graphics source 104 image is drawn. Otherwise, the two overlapping images will add together, producing undesired results. Such means tend to be complex for arbitrary images.

A second problem is similar, but occurs when a window frame is moved, perhaps by being dragged by the user using a mouse input device. As the window frame is moved, both the graphics source 104 and the overlay source 100 must be updated (typically by software either re-drawing images in the frame buffers, or modifying registers which control window characteristics) with the new position of the graphics window image. This maintains alignment of the two images, so that the video contents of the window remain within the window frame as the window is dragged. In many software environments there is a considerable delay between updating the graphics source 104 and the video source 100. During this interim period, the user will see the window frame image move but the overlay image will continue playing in the old location for a while. The two non-aligned images overlap and sum, creating undesired colors on the display monitor.

In order to eliminate or reduce side effects from these problems, switched video merging techniques have been developed, often based on recognizing a special key color to trigger the switch from the graphics source to the video source. FIG. 3 illustrates a display system implementing switched video merging. As an example, assume that a graphics card acts as the default source 104, and a video card acts as the overlay source 100, as in the previous example. However, in this case, only one source is selected at any instant, by a multiplexer (MUX) 300 to actually drive the display monitor. The graphics card 104 stores both the window frame image as well as a recognizable key color (not necessarily black) within the window frame. A key color detection circuit 302 senses the key color output from the graphics card 104, and switches the MUX 300 to select the video overlay signal when the key color is output from the graphics card 104. Using this approach, the video image is overlaid on the graphics background through synchronized switching between the video and graphics sources. In addition, arbitrary graphics shapes may be drawn by the graphics source 104 to selectively mask the overlay video with display graphics images without complex means within the overlay source itself.

The switched video merging technique of FIG. 3 suffers from the need to include high speed switching components in the signal path between the sources and the display monitor. Any such components necessarily degrade the original signal somewhat, either by introducing distortion due to impedance non-linearities, by blurring due to the low-pass filtering effect of limited bandwidth components, or by other artifacts. In addition, the switching speed of the MUX 300 must be fast enough to accommodate rapid changes in the display between default and overlay pixels. A computer display may be as large as 1,024 by 768 pixels or larger and operate at a frame rate on the order of 70 or more flames per second. Under these circumstances, the MUX 300 may require a switching frequency on the order of 100 MHz, because switching delays of 10 nsec will shift the intended switchover position by a full pixel or more. Such fast switches are expensive and difficult to implement.

FIG. 4 illustrates a video merging technique which uses a current summing technique, combined with a color key technique. Current summing eliminates the need for switches in the image signal paths. Further, key detection enables arbitrary masking graphics and minimizes the undesired side effects due to system update delays and other causes. As shown in FIG. 4, default and overlay signals from the default source 400 and the overlay signal source 402, respectively, are summed into a current summing node 404 for output to the display (not shown). A key color (typically black) that is output from the default source 400 indicates those areas of the display in which the overlay signal is to be applied. The system includes a key detection circuit 406 for detecting when the default source 400 outputs the key color. In response to detecting the key color, the key detection circuit 406 enables the overlay source 402 to output the overlay image. This may preferably be done by enabling an output DAC in the overlay source 402 by employing an enabling signal (such as that used in the Intel 82750DB video output controller chip) or other means. This avoids the need for a switch in the overlay source analog signal path. Because a black key color is represented by a zero-current or low-current default signal, the addition of a non-zero overlay signal with the zero-current key color in the current summing node 404 results in a current sum that represents only the overlay image.

Note that a current summing key detection system such as that of FIG. 4 requires a buffer 408 to isolate the default signal from the overlay signal. Without the buffer, because the two signals are summed, the default signal could not be detected independently from the overlay source. Thus, without the buffer, the key detection logic 406 would be unable to determine whether the default source 400 is generating the key color signal. In fact, assuming black detect as an example, as soon as the overlay is turned on and outputs a non-black color, the key detection circuit 406 would turn it off again.

One problem with the key color approach of FIG. 4 is the limited bandwidth of the buffer 408. Because of the high spatial frequency of the typical video display, the default signal source 400 must output a correspondingly high frequency signal to the buffer 408. Most buffers do not have sufficient bandwidth to handle such video signals. This causes the buffer 408 to act as a low pass filter, resulting in smearing and blurring of the default image on the display.

Ideally, no buffers or any other device should be interposed in the connection between the signal sources and the display. Any buffering or amplification will necessarily cause some distortion or noise due to bandwidth limitations and non-linearities. Linear, high bandwidth devices are expensive and difficult to find.

SUMMARY OF THE INVENTION

The present invention overcomes the drawbacks of the prior art by providing both monochrome and color video mixers that combine the current summing and key detection approaches, and obviate the need for buffers or other components between the image sources and the display. The monochrome video mixer mixes an overlay image with a default image to form a composite image to be displayed on a computer display. The video mixer includes a summing circuit for summing an overlay signal and a default signal to generate a composite signal. The overlay signal corresponds to the overlay image, the default signal corresponds to the default image, and the composite signal corresponds to the composite image. The video mixer also includes a comparator that has a first input for receiving the composite signal and a second input for receiving the overlay signal. The comparator compares the signal level measured at the first input with the signal level measured at the second input. In response to the comparison, the comparator provides an enable signal in the presence of a default key color signal. In response to the enable signal, an enabling circuit in the video mixer provides the overlay signal to the summing circuit.

In one embodiment, the enabling circuit provides the overlay signal to the summing circuit when the enable signal indicates that the first input signal level is equal to the second input signal level. Alternatively, the overlay signal is provided to the summing circuit when the first input signal level is less than the second input signal level. A reference overlay signal source provides a first overlay signal as the overlay signal to the second input of the comparator, and a "working" overlay signal source provides a second overlay signal as the overlay signal to the summing circuit, the second overlay signal being proportional to the first overlay signal by a factor K, and electrically isolated from the first overlay signal. The reference overlay signal source may be a reference digital-to-analog converter (DAC) for converting a digital overlay signal to the first overlay signal, while the working overlay signal source is a "working" DAC for converting the digital overlay signal to the second overlay signal. Alternatively, the overlay signal sources may be implemented using switched analog buffers.

The video mixer further includes a transmission line for coupling the composite signal to the display, a reference resistor having a first terminal, coupled to the second comparator input, and a second terminal coupled to ground. The summing circuit is preferably a current summing node, and the first comparator input signal level is the voltage measured across the transmission line, while the second comparator input signal level is the voltage measured across the reference resistor, the resistance of the reference resistor being set proportional to the resistance of the transmission line by the factor K. As a further improvement, the video mixer includes an offset current source coupled to provide an offset current at the second comparator input. The offset current is set equal to the current of the default signal corresponding to a key color, which is preferably black. The offset current may also include a small guardband current to account for comparator nonidealities and noise.

A color video mixer of the present invention includes a number of the monochrome video mixers described above, wherein each video mixer provides a separate output to a color gun of the display. The overlay signal from each mixer is passed on to its respective color gun (through the mixer summing circuit) only if all the comparators (for all monochrome mixers) provide an enable signal.

DETAILED DESCRIPTION OF THE INVENTION

The present invention provides a method and apparatus for analog video merging and key detection. For purposes of explanation, numerous specific details are set forth to provide a thorough understanding of the present invention. However, it will be understood by one skilled in the art, from reading this disclosure, that the invention may be practiced without further details. Moreover, well-known elements, devices, process steps and the like are not set forth in order to avoid obscuring the invention.

Figure 1:
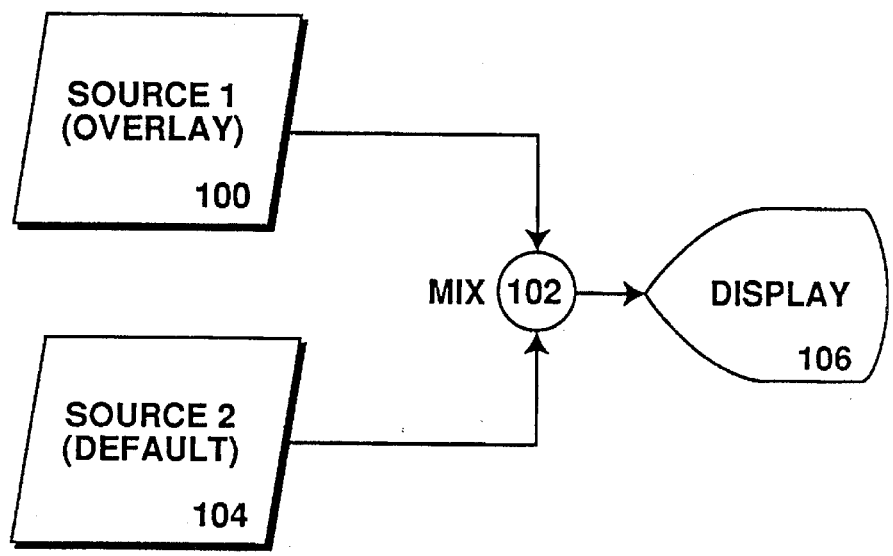
FIG. 1 is a simplified block diagram of a video mixing system.
Figure 2:
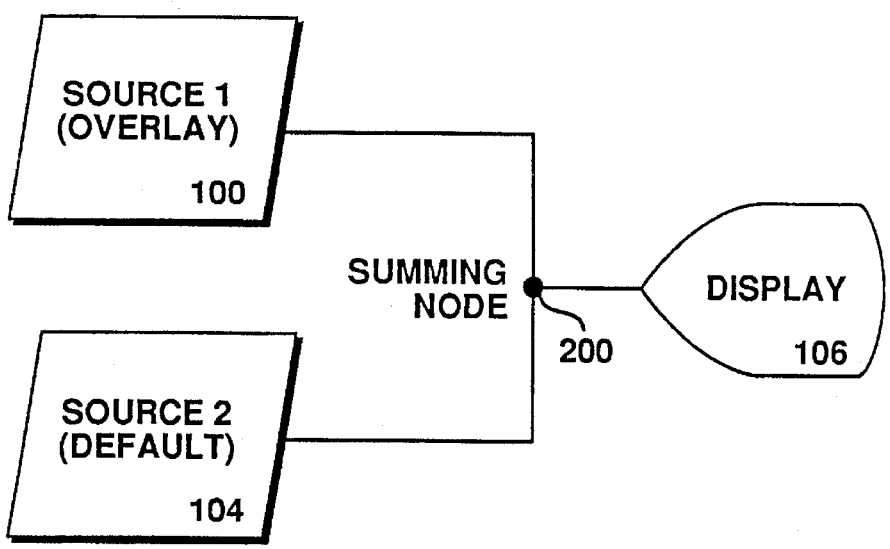
FIG. 2 illustrates a video merging system employing a current summing approach.
Figure 3:
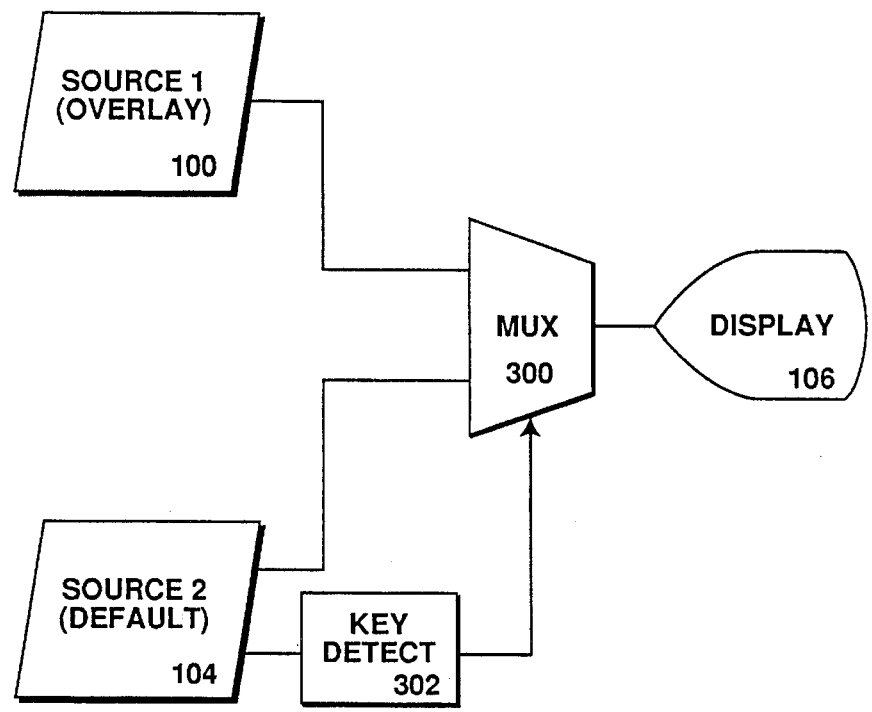
FIG. 3 illustrates a display system implementing switched video merging.
Figure 4:
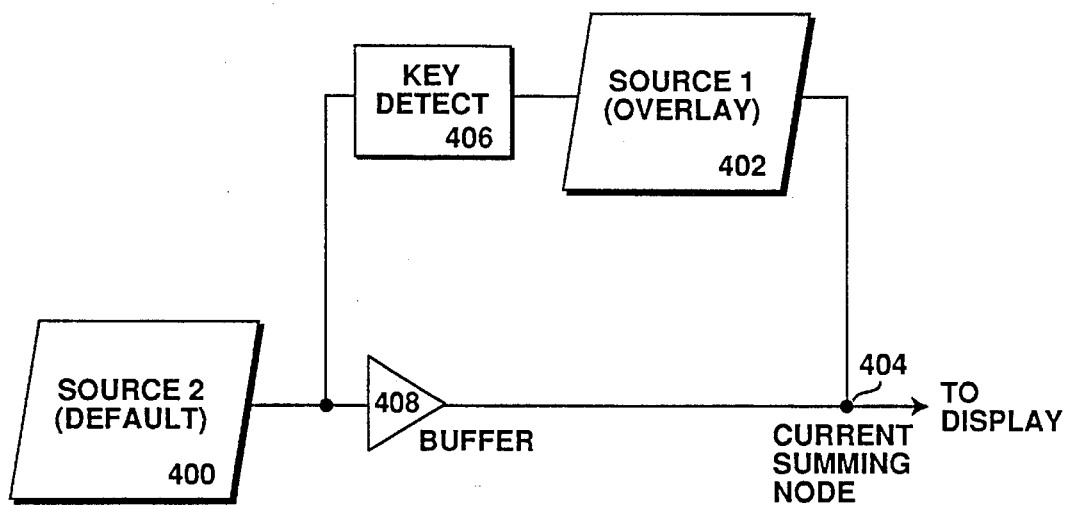
FIG. 4 illustrates a video merging system employing key detection.
Figure 5:
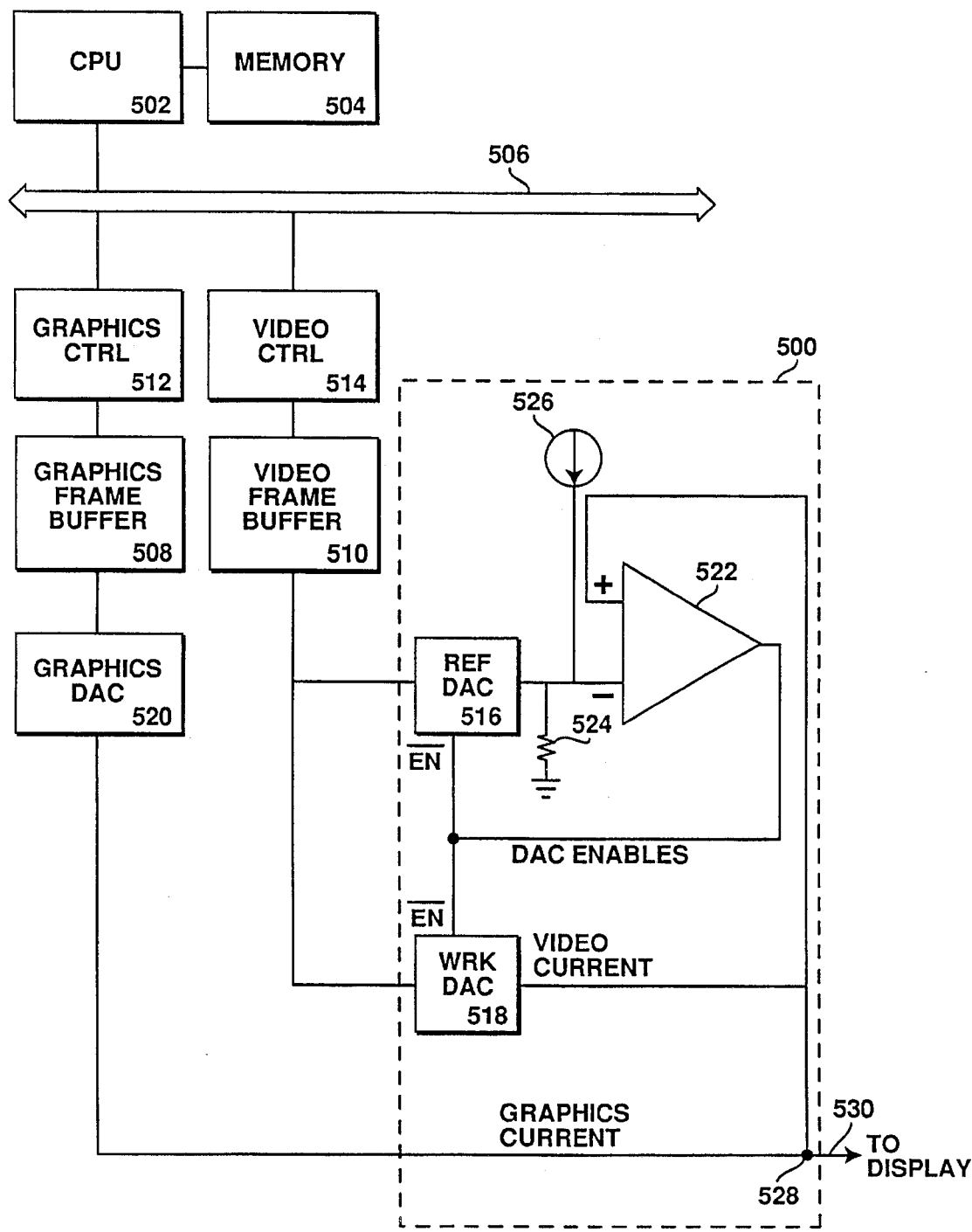
FIG. 5 illustrates a computer system incorporating one embodiment of the video merging system of the present invention.

FIG. 5 illustrates the video merging system of the present invention, which employs current summing and key detection techniques. The video mixer 500 of the present invention is shown incorporated into a computer system in which a CPU 502 communicates with a memory subsystem 504 and utilizes an I/O bus 506. The computer's output is ultimately to be rendered on a display (not shown), such as display 106 shown in FIG. 6. The CPU 502 performs manipulations and calculations on data stored in the memory system 504. The memory system 504 may be any of several types including semiconductor RAM, magnetic disk, optical disk, video or audio tape or a combination of several such devices.

The system shown in FIG. 5 is an example of a low integration monochrome display controller configuration. The system is considered low integration in that graphics data and video data are loosely coupled. (In this example, default data is denoted "graphics" data, while overlay data is denoted "video" data.) Separate frame buffers are maintained as the graphics frame buffer 508 and the video frame buffer 510. The graphics frame buffer 508 is driven by a graphics controller 512. The graphics frame buffer has associated with each pixel to be displayed a number of bits which corresponds to the gray scale level of the pixel. The video frame buffer 510 is driven by a video controller 514. One skilled in the art will recognize that the present invention may be incorporated in not only the system of FIG. 5, but in any system providing default (e.g., graphics) and overlay (e.g., video) signals for display. For example, the overlay signal could be supplied externally by a digital video camera.

The video mixer 500 of the present invention receives digital pixel information from the graphics frame buffer 508 and the video frame buffer 510. In this embodiment, the video mixer 500 includes a reference digital-to-analog converter (DAC) 516 and a "working" DAC 518, both coupled to receive the digital video (overlay) signal representing pixel gray scale from the video frame buffer 510. Both the reference DAC 516 and the working DAC 518 provide an analog representation of the digital video signal.

A graphics DAC 520 receives a video graphics signal representing pixel color from the graphics frame buffer 508. The graphics DAC converts the digital graphics signal to an analog signal representing the graphics pixel information.

One skilled in the art will understand that the graphics DAC 520 may be provided in the graphics subsystem as shown, or incorporated into the video mixer 500, as long as the video mixer 500 receives as an input the analog graphics signal. The mixer of the present invention further includes a comparator 522, a reference resistor 524 and an offset current source 526.

The present invention operates as follows. The mixer 500 assumes black as a key color for key color detection purposes. The video current of the video signal produced by the working DAC 518 and the graphics current of the analog graphics signal from the graphics DAC 520 are summed in a current summing node 528. This summed current is transmitted over a transmission line 530 to a display device.

The video mixer 500 of the present invention provides a means to detect the key color from the summed current signal without introducing isolating buffers between the analog current sources and the display. The voltage comparator 522 detects the difference between the voltage on the transmission line 530 and the voltage derived from the reference DAC 516 video current across the reference resistor 524. The reference resistor 524 is calibrated to be proportional to the load resistance of the transmission line 530, i.e., the reference resistance is greater than the transmission line resistance by a proportionality factor K. Conversely, the reference DAC 516 is calibrated to attenuate the video signal at its output by the same factor K. In other words, the current measured at the output of the reference DAC 516 is 1/K times the working DAC 518 output current. In this manner, by increasing the reference resistance, the power requirements of the reference DAC 516 can be greatly relaxed while still obtaining a reference voltage across the reference resistor 524 on the same order as the voltage across the transmission line. The working DAC 518, which drives the transmission line 530, must operate at a relatively higher power because it must drive the display device.

When the graphics DAC 520 generates the key color, i.e., black, then the graphics current ideally has a zero value. In this ideal case, the comparator 522 will receive at its positive input a voltage caused only by the video current across the transmission line load. Assuming the offset current source 526 is turned off, the comparator 522 will measure at its negative input the same voltage because the reference resistor 524 has a resistance K times the transmission line resistance while the current from the reference DAC 516 is 1/K times the video current produced by the working DAC 518. Assuming an ideal comparator, the zero differential at the inputs of the comparator 522 causes the comparator 522 to produce a zero level logic signal, which keeps both the reference DAC 516 and the working DAC 518 enabled.

The above description assumed the ideal case in which (1) the black graphics current was zero, and (2) the comparator provided a stable output in response to a zero differential input. In reality, however, the black graphics current may actually exhibit a small non-zero offset value. Further, comparators typically exhibit the following real-world behavior:

$v_1 > v_2$ C=1

$v_1 = v_2$ C=indeterminate $v_1 < v_2$ C=0 where $v_1$=positive comparator input $v_2$=negative comparator input

C=comparator output.

Thus, the nonideal comparator output is indeterminate for a zero differential input. These nonidealities may be accounted for using an offset current source 526 according to the following analysis:

Let $v_W$=the working voltage across the transmission line caused by the current provided by the working DAC 518;

$v_G$=the graphics voltage across the transmission line;

$v_R$=the voltage across the reference resistor ($R_{ref}$) 524 caused by the reference current provided by the reference DAC 516; and $v_{off}$=the voltage across $R_{ref}$ 524 caused by the offset current source 526.

To enable the DACs 516 and 518, C=0, which occurs when $v_1 < v_2$, where $v_1 = v_W + v_G$; $v_2 = v_R + v_{off}$, so that $v_W + v_G < v_R + v_{off}$, where $v_W = v_R$, so that $v_G < v_{off}$ Let the black voltage be represented as $v_B$. It is desired that the DACs 516 and 518 be enabled when the black key color is present. Then $v_G = v_B < v_{off}$. To ensure this condition holds, $v_{off}$ should be set to $v_{off} = v_B + v_n$, where $v_n$ is a small guardband voltage to account for the comparator nonideality. The guardband voltage may additionally account for noise at the positive comparator input. As an example, $v_B$ and $v_n$ may practically be on the order of 54 mV and 3 mV, respectively. It follows that the offset current source 526 should be set to an offset current $i_{off} = v_{off}/R_{ref}$ to ensure that the DACs 516 and 518 are enabled so as to pass the video signal onto the display in response to a key color detection.

When the graphics DAC 520 is not generating the black key color signal, the graphics current is greater than the zero or offset current of the black color signal. In that case, the positive comparator input will be greater than the negative comparator input, thereby causing the comparator 522 to generate a high logic level signal that disables the reference DAC 516 and the working DAC 518. Thus, in the absence of detection of the key color, only the graphics current will be fed into the summing node 528 and passed on to the display through the transmission line 530. When both DACs are off and the graphics current reduces to the black current value, then the comparator 522 would be comparing the zero or offset graphics voltage across the transmission line 530 with the respective zero or offset voltage across the reference resistor 524, which would cause the video DACs 516 and 518 to be re-enabled.

Figure 6:
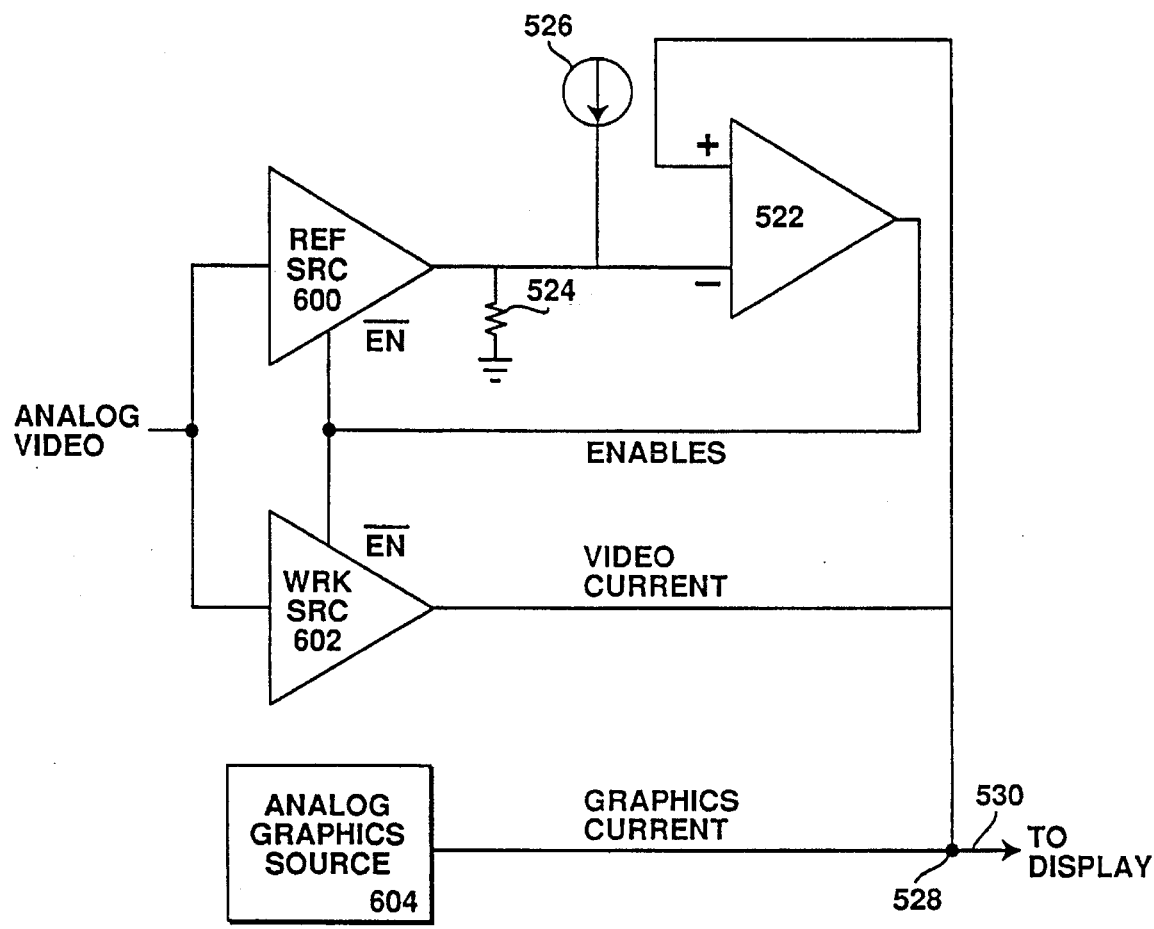
FIG. 6 illustrates another embodiment of the video merging system of the present invention.

One skilled in the art will recognize that the DACs 516 and 518 may in general be replaced by any switchable analog overlay signal source, and that similarly the graphics current may be provided by any switchable analog default signal source. For example, as shown in FIG. 6 the reference DAC 516 and the working DAC 518 are replaced by switchable analog buffers 600 and 602, respectively. In response to the enable signal provided by the comparator 522, these switchable analog signal sources pass on an analog video signal to the negative input of the comparator 522 and to the current summing node 528. The analog video signal may be provided by a number of devices, such as a video camera. As shown in FIG. 6, the graphics subsystem of FIG. 5 may be generically replaced by an analog graphic source 604. Of course, the analog graphics source 604 may be the same as the graphic subsystem including the graphics controller 512, the frame buffer 508 and the graphics DAC 520 of FIG. 5. Alternatively, the analog graphics source 604 may also be an analog video camera to permit two analog video camera signals to be overlaid.

Figure 7:
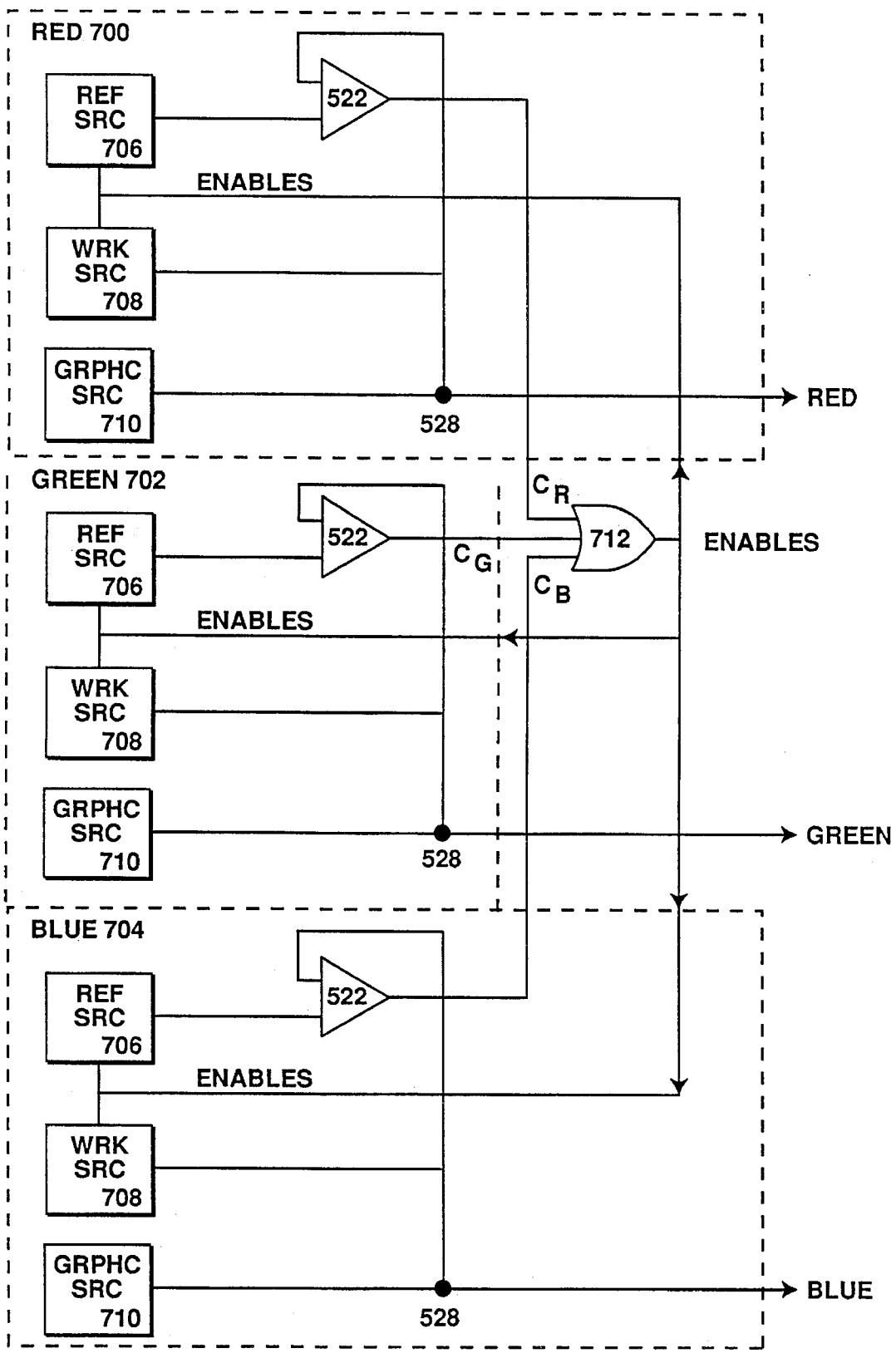
FIG. 7 illustrates a color video mixer of the present invention.

The foregoing discussion concerns video mixing in monochrome systems. However, many computer output display devices are color monitors which use color raster guns for creating color images. The video mixer of the present invention may easily be adapted for use in a color system, as shown in FIG. 7. The embodiment of FIG. 7 assumes that the popular RGB color model is being used. Of course, those skilled in the art will recognize that the present invention may be adapted to any display system regardless of the color model employed. For a thorough description of various models, see section 13.3 of *Computer Graphics Principles and Practices*, (Second Edition), Foley, VanDam, Feiner and Hughes, Addision Wesley, 1987. In the RGB color model, the computer system would use three video mixers, one for each of the RGB colors.

FIG. 7 illustrates a color video mixer of the present invention. The color video mixer includes a red video mixer 700, a green video mixer 702 and a blue video mixer 704. Each video mixer incorporates a switchable reference analog video source 706, a switchable working analog video source 708, and a graphics analog source 710. Each video mixer also includes a comparator 522 in essentially the same configuration as shown in FIGS. 5 and 6. Each video mixer also includes a reference resistor and an offset current source, which are not shown to avoid complicating FIG. 7. In each video mixer, the working video and graphics signals are summed in a current summing node 528, and the mixed result is outputted to red, green and blue raster guns, respectively.

In a color system, key color detection occurs only when a key color is detected for all colors. In the system of FIG. 7, this occurs when the respective outputs $C_R$, $C_G$, and $C_B$ of the comparators 522 of the red, green and blue video mixers are all zero. Accordingly, these outputs are fed into a three input ORgate 712. When all three comparator outputs are logic zero, the analog reference sources 706 and working sources 708 are enabled to pass on the video overlay signal to the appropriate color gun.

One skilled in the art will recognize that the reference sources 706, the working sources 708 and the graphics sources 710 may be any switchable analog signal source, including but not limited to DACs (such as those shown in FIG. 5) and switchable analog buffers (such as those shown in FIG. 6). Further, one skilled in the art will recognize that with minor modifications, the OR gate 712 of this embodiment may be replaced with wired OR technology or any other circuitry that achieves the same functionality.

The present invention can be implemented using discrete components or embodied in an ASIC (application specific integrated circuit). In either case, the reference resistor 524 will need to be set proportional to the overall impedance represented by the current summing node (typically 75 ohms). If the current summing node impedance might vary (due to different display monitor or image source terminations), then the reference resistor 524 and the offset current source 526 must be calibrated. Either a manual or a programmed procedure may be employed. For example, the resistance may be varied using a standard mechanical variable resistor, or an array of switched parallel resistors programmed to various values by modifying the contents of a register. The offset current should be adjusted, with both the graphics and the overlay sources outputting black, to a value slightly greater than that required to cause the comparator 522 to toggle between modes. The reference resistance should then be adjusted so that, with full white overlay output, a low (dark color) output from the graphics source causes the comparator 522 to toggle to graphics mode, while a black output from the graphics source causes the comparator 522 to toggle to overlay mode. This procedure may need to be repeated until adjustments are stable.

It should be appreciated that the video mixer of the present invention isolates the overlay signal used for key color detection from the overlay signal conveyed to the display while avoiding the need to interpose buffers or other components between the image signals and the display. Thus, the present invention minimizes the distortion of the displayed signals, and provides support for high pixel display rates without requiring fast amplifiers and switches.

It will also be appreciated that various modifications and alterations might be made by those skilled in the art without departing from the spirit and scope of the present invention. In particular, one skilled in the art will understand that circuit configurations other than the use of separate DACs or switchable analog buffers may be used to isolate a reference overlay signal for subtraction from the composite signal. The invention should, therefore, be measured in terms of the claims which follow.

What is claimed is:

1. In a computer display system for displaying a composite image on a display, a video mixer for mixing an overlay image with a default image to form the composite image, the video mixer comprising:

summing means for summing a first overlay signal and a default signal to thereby provide a composite signal, wherein the first overlay signal corresponds to the overlay image, the default signal corresponds to the default image, and the composite signal corresponds to the composite image;

a comparator having a first input for receiving the composite signal and a second input for receiving a second overlay signal, and for comparing a first input signal level to a second input signal level so as to provide an enable signal in the presence of a default key color signal; and enabling means for coupling the first overlay signal to the summing means in response to the enable signal.

2. The video mixer of claim 1, wherein the enabling means couples the first overlay signal to the summing means when the enable signal indicates that the first input signal level is equal to the second input signal level.

3. The video mixer of claim 1, wherein the enabling means couples the first overlay signal to the summing means when the enable signal indicates that the first input signal level is less than the second input signal level.

4. The video mixer of claim 1, wherein the enabling means couples the second overlay signal to the comparator second input in response to the enable signal.

5. The video mixer of claim 1, further comprising:

a reference overlay signal source for providing the second overlay signal as the overlay signal to the second input of the comparator; and a working overlay signal source for providing the first overlay signal as the overlay signal to the summing means, wherein the first overlay signal is proportional to the second overlay signal by a proportionality factor K, and is electrically isolated from the second overlay signal.

6. The video mixer of claim 5, wherein:

the reference overlay signal source is a reference digital-to-analog converter (DAC) for converting a digital overlay signal to the second overlay signal; and the working overlay signal source is a working DAC for converting the digital overlay signal to the first overlay signal.

7. The video mixer of claim 5, wherein:

the reference overlay signal source is a reference switchable analog buffer; and the working overlay signal source is a working switchable analog buffer.

8. The video mixer of claim 5, further comprising:

a transmission line for coupling the composite signal to the display; and a reference resistor having a first terminal, coupled to the second comparator input, and a second terminal coupled to ground, wherein the summing means is a current summing node, the resistance of the reference resistor is set to be proportional to the resistance of the transmission line by the proportionality factor K, the first comparator input signal level is the voltage measured across the transmission line, and the second comparator input signal level is the voltage measured across the reference resistor.

9. The video mixer of claim 2, further comprising an offset current source coupled to provide an offset current at the second comparator input, wherein the offset current is set equal to the current of the default signal corresponding to the key color.

10. The video mixer of claim 9, wherein the key color is black.

11. The video mixer of claim 3, further comprising an offset current source coupled to provide an offset current at the second comparator input, wherein the offset current is set equal to the current of the default signal corresponding to the key color plus a guardband current selected so that the first input signal level is less than the second input signal level when the default signal corresponds to the key color.

12. The video mixer of claim 11, wherein the key color is black.

13. In a computer display system for displaying a composite image on a display, a method for mixing an overlay image with a default image to form the composite image, the method comprising the steps of:

summing a first overlay signal and a default signal to thereby provide a composite signal, wherein the first overlay signal corresponds to the overlay image, the default signal corresponds to the default image, and the composite signal corresponds to the composite image;

comparing a first input signal level to a second input signal level so as to provide an enable signal in the presence of a default key color signal, wherein the first input signal level corresponds to the composite signal and the second input signal level corresponds to a second overlay signal; and providing the first overlay signal to the display in response to the enable signal.

14. The method of claim 13, wherein the enable signal indicates that the first input signal level is equal to the second input signal level.

15. The method of claim 13, wherein the enable signal indicates that the first input signal level is less than the second input signal level.

16. The method of claim 13, wherein:

the comparing step further comprises the step of providing the second overlay signal as the overlay signal corresponding to the second input signal level; and the summing step further comprises the step of providing the first overlay signal as the overlay signal for summing with the default signal, wherein the first overlay signal is proportional to the second overlay signal by a proportionality factor K, and is electrically isolated from the second overlay signal.

17. The method of claim 16, further comprising the steps of:

converting a digital overlay signal to the first overlay signal, the first overlay signal being in analog form; and converting the digital overlay signal to the second overlay signal, the second overlay signal being in analog form.

18. The method of claim 14, the comparing step further comprising the step of injecting an offset current as part of the second input signal level, wherein the offset current equals the current of the default signal corresponding to the key color.

19. The method of claim 18, wherein the key color is black.

20. The method of claim 15, the comparing step further comprising the step of injecting an offset current as part of the second input signal level, wherein the offset current equals the current of the default signal corresponding to the key color plus a guardband current selected so that the first input signal level is less than the second input signal level when the default signal corresponds to the key color.

21. The method of claim 20, wherein the key color is black.

22. A computer display system for displaying a composite image, the system comprising:

a processor for processing image information;

a memory device, coupled to the processor, for storing image information;

a bus for conveying image information;

a graphics subsystem, coupled to the bus, for providing a default signal corresponding to a default image;

a video mixer, coupled to the graphics subsystem, for mixing an overlay image with the default image to form the composite image, the video mixer comprising:

summing means for summing a first overlay signal and the default signal to thereby provide a composite signal, wherein the first overlay signal corresponds to the overlay image, and the composite signal corresponds to the composite image;

a comparator having a first input for receiving the composite signal and a second input for receiving a second overlay signal, and for comparing a first input signal level to a second input signal level so as to provide an enable signal in the presence of a default key color signal; and enabling means for coupling the first overlay signal to the summing means in response to the enable signal; and a display, coupled to the video mixer, for displaying the composite image in response to the composite signal.

23. The system of claim 22, wherein the enabling means couples the first overlay signal to the summing means when the enable signal indicates that the first input signal level is equal to the second input signal level.

24. The system of claim 22, wherein the enabling means couples the first overlay signal to the summing means when the enable signal indicates that the first input signal level is less than the second input signal level.

25. The system of claim 22, wherein the enabling means couples the second overlay signal to the comparator second input in response to the enable signal.

26. The system of claim 22, the video mixer further comprising:

a reference overlay signal source for providing the second overlay signal as the overlay signal to the second input of the comparator; and a working overlay signal source for providing the first overlay signal as the overlay signal to the summing means, wherein the first overlay signal is proportional to the second overlay signal by a proportionality factor K, and is electrically isolated from the second overlay signal.

27. The system of claim 26, wherein:

the reference overlay signal source is a reference digital-to-analog converter (DAC) for converting a digital overlay signal to the second overlay signal; and the working overlay signal source is a working DAC for converting the digital overlay signal to the first overlay signal.

28. The system of claim 27, further comprising a video subsystem, coupled to the bus, for providing the digital overlay signal to the video mixer.

29. The system of claim 27, further comprising an external video source for providing the digital overlay signal to the video mixer.

30. The system of claim 29, wherein the external video source is a video camera.

31. The system of claim 26, wherein:

the reference overlay signal source is a reference switchable analog buffer; and the working overlay signal source is a working switchable analog buffer.

32. The system of claim 26, the video mixer further comprising:

a transmission line for coupling the composite signal to the display; and a reference resistor having a first terminal, coupled to the second comparator input, and a second terminal coupled to ground, wherein the summing means is a current summing node, the resistance of the reference resistor is set to be proportional to the resistance of the transmission line by a proportionality factor K, the first comparator input signal level is the voltage measured across the transmission line, and the second comparator input signal level is the voltage measured across the reference resistor.

33. The system of claim 23, the video mixer further comprising an offset current source coupled to provide an offset current at the second comparator input, the offset current set equal to the current of the default signal corresponding to the key color.

34. The system of claim 33, wherein the key color is black.

35. The system of claim 24, the video mixer further comprising an offset current source coupled to provide an offset current at the second comparator input, wherein the offset current is set equal to the current of the default signal corresponding to the key color plus a guardband current selected so that the first input signal level is less than the second input signal level when the default signal corresponds to the key color.

36. The system of claim 35, wherein the key color is black.

37. In a computer display system for displaying a color composite image formed of at least one monochromatic composite image, a color video mixer comprising:

at least one monochromatic video mixer for mixing a corresponding monochromatic overlay image with a corresponding monochromatic default image to form a corresponding monochromatic composite image, each monochromatic video mixer comprising:

summing means for summing a first overlay signal and a default signal to thereby provide a composite signal, wherein the first overlay signal corresponds to the overlay image, the default signal corresponds to the default image, and the composite signal corresponds to the monochromatic composite image;

a comparator having a first input for receiving the composite signal and a second input for receiving a second overlay signal, and for comparing a first input signal level to a second input signal level so as to provide an enable signal in the presence of a default key color signal; and enabling means for coupling each overlay signal to its corresponding summing circuit if all the comparators provide an enable signal.

38. The color video mixer of claim 37, wherein a comparator provides an enable signal if its first input signal level is equal to its second input signal level.

39. The color video mixer of claim 37, wherein a comparator provides an enable signal if its first input signal level is less than its second input signal level.

40. The color video mixer of claim 37, wherein the enabling means couples each overlay signal to the second input of its corresponding comparator if all the comparators provide an enable signal.

41. The color video mixer of claim 37, each monochromatic video mixer further comprising:

a reference overlay signal source for providing the second overlay signal as the overlay signal to the second input of the comparator; and a working overlay signal source for providing the first overlay signal as the overlay signal to the summing means, wherein the first overlay signal is proportional to the second overlay signal by a proportionality factor K, and is electrically isolated from the second overlay signal.

42. The color video mixer of claim 41, wherein:

the reference overlay signal source is a reference digital-to-analog converter (DAC) for converting a digital overlay signal to the second overlay signal; and the working overlay signal source is a working DAC for converting the digital overlay signal to the first overlay signal.

43. The color video mixer of claim 41, wherein:

the reference overlay signal source is a reference switchable analog buffer; and the working overlay signal source is a working switchable analog buffer, wherein the working buffer is enabled to provide the first overlay signal to the summing means when the enable signal indicates that the first input signal level is equal to the second input signal level.

44. The color video mixer of claim 41, each monochromatic video mixer further comprising:

a transmission line for coupling the composite signal to a corresponding color gun of the display; and a reference resistor having a first terminal, coupled to the second comparator input, and a second terminal coupled to ground, wherein the summing means is a current summing node, the resistance of the reference resistor is set to be proportional to the resistance of the transmission line by the proportionality factor K, the first comparator input signal level is the voltage measured across the transmission line, and the second comparator input signal level is the voltage measured across the reference resistor.

45. The color video mixer of claim 38, each monochromatic video mixer further comprising an offset current source coupled to provide an offset current at the second comparator input, wherein the offset current is set equal to the current of the default signal corresponding to the key color.

46. The color video mixer of claim 45, wherein the key color is black.

47. The color video mixer of claim 38, each monochromatic video mixer further comprising an offset current source coupled to provide an offset current at the second comparator input, wherein the offset current is set equal to the current of the default signal corresponding to the key color plus a guardband current selected so that the first input signal level is less than the second input signal level when the default signal corresponds to the key color.

48. The color video mixer of claim 47, wherein the key color is black.

49. A video mixer that mixes an overlay image with a default image to form a composite image, the video mixer comprising:

a summing node that sums an overlay signal with a default signal to provide a composite signal;

a comparator having a first input that receives a first input signal corresponding to the composite signal, and a second input that receives a second input signal, wherein the comparator compares a first input signal level with a second input signal level, and provides an enable signal;

a signal source that couples a signal corresponding to the second input signal of the comparator to the summing node in response to the enable signal.

50. The video mixer of claim 49 wherein the second input signal corresponds to the overlay signal.

* * * * *

UNITED STATES PATENT AND TRADEMARK OFFICE
CERTIFICATE OF CORRECTION

PATENT NO.    : 5,583,536
DATED         : December 10, 1996
INVENTOR(S)   : Benjamin M. Cahill, III It is certified that error appears in the above-identified patent and that said Letters Patent is hereby corrected as shown below:

In column 2 at line 67 delete "flames" and insert --frames--

Signed and Sealed this

Eighth Day of April, 1997

Attest:

BRUCE LEHMAN

*Attesting Officer*    *Commissioner of Patents and Trademarks*